(12) United States Patent
Bedros et al.

(10) Patent No.: US 8,442,278 B2
(45) Date of Patent: May 14, 2013

(54) COVARIANCE BASED FACE ASSOCIATION (75) Inventors: Saad J. Bedros, West St. Paul, MN (US); Roland Miezianko, Plymouth, MN (US)

(73) Assignee: Honeywell International Inc., Morristown, NJ (US)

(*) Notice: Subject to any disclaimer, the term of this patent is extended or adjusted under 35 U.S.C. 154(b) by 1075 days.

(21) Appl. No.: 12/039,627

(22) Filed: Feb. 28, 2008

(65) Prior Publication Data
US 2009/0220127 A1 Sep. 3, 2009

(51) Int. Cl.
*G06K 9/00* (2006.01)

(52) U.S. Cl.
USPC .......................................... 382/118; 382/115

(58) Field of Classification Search ................. 382/103, 382/115, 118
See application file for complete search history.

(56) References Cited

U.S. PATENT DOCUMENTS

| | | | |
|---|---|---|---|
| 4,228,421 A | 10/1980 | Asada | |
| 5,416,577 A | 5/1995 | Haggerty et al. | |
| 5,420,682 A | 5/1995 | Haggerty et al. | |
| 6,904,159 B2 | 6/2005 | Porikli | |
| 7,006,572 B2 | 2/2006 | Porikli et al. | |
| 7,027,403 B2 | 4/2006 | Porikli et al. | |
| 7,103,229 B2 | 9/2006 | Porikli | |
| 7,142,602 B2 | 11/2006 | Porikli et al. | |
| 7,209,438 B2 | 4/2007 | Sahinoglu et al. | |
| 7,224,735 B2 | 5/2007 | Porikli et al. | |
| 7,263,472 B2 | 8/2007 | Porikli | |
| 2002/0131641 A1* | 9/2002 | Luo et al. | 382/218 |
| 2002/0136449 A1* | 9/2002 | Park et al. | 382/164 |
| 2002/0164075 A1 | 11/2002 | Acharya et al. | |
| 2003/0086593 A1* | 5/2003 | Liu et al. | 382/118 |
| 2007/0133878 A1* | 6/2007 | Porikli et al. | 382/190 |
| 2008/0107311 A1* | 5/2008 | Huang et al. | 382/118 |

FOREIGN PATENT DOCUMENTS

| | | |
|---|---|---|
| EP | 1818870 A2 | 8/2007 |
| JP | 2003-271958 A2 | 9/2003 |

OTHER PUBLICATIONS

"Eigenface", http://en.wikipedia.org/wiki/Eigenface, Wikipedia entry,(Oct. 30, 2007).
Ochoa, Benjamin , et al., "Covariance Propagation for Guided Matching", *SMVP* 2006, Graz, Austria, (2006),12 pgs.
"United Kingdom Application Serial No. GB0902654, Combined Search and Examination Report mailed Jun. 9, 2009", 6 pgs.

* cited by examiner

*Primary Examiner* — Edward Park
(74) *Attorney, Agent, or Firm* — Schwegman, Lundberg & Woessner, P.A.

(57) ABSTRACT

A system and method are provided for associating faces to determine whether the faces are similar. For example a captured face may be associated with known faces to determine which known face the captured most closely resembles. The system and method incorporate the use of Gabor filters applied to masked face images to develop covariance matrixes. The covariance matrixes are subject to a similarity measure to determine the similarity of the images.

15 Claims, 6 Drawing Sheets

COVARIANCE BASED FACE ASSOCIATION

BACKGROUND

Association of people thru their faces across cameras and time is a demanding need for wide area surveillance. Given that faces are detected, they need to be associated to form a track, and also they need to be associated across cameras or time in order to build a better understanding where the person was within the surveyed site or other sites at different times.

Eigenfaces are a set of eigenvectors used in the computer vision problem of human face recognition. The approach of using eigenfaces for recognition was developed by Matthew Turk and Alex Pentland beginning in 1987, and is considered the first facial recognition technology that worked. These eigenvectors are derived from a covariance matrix of the probability distribution of the high dimensional vector space of possible faces of human beings.

An eigenvector of a matrix is a vector such that, if multiplied with the matrix, the result is always an integer multiple of that vector. This integer value is the corresponding eigenvalue of the eigenvector. This relationship can be described by the equation $M \times u = \lambda \times u$, where u is an eigenvector of the matrix M and $\lambda$ is the corresponding eigenvalue.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software, hardware and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system and method are provided for associating images of faces and determining whether the faces in the images are similar. The images of the faces may be captured by a security monitoring system and compared with known face images. The operation of the system may utilize face capture software to isolate faces in an overall image. For example the software may isolate the face of an unknown person on a single frame from a camera image to have it analyzed. A repository of known images may exist to which the captured image may be compared. By comparing the captured image with the known images it may be possible to determine the most likely match for the captured image. The face image may be captured by any number of methods and provided to the system.

Figure 1:
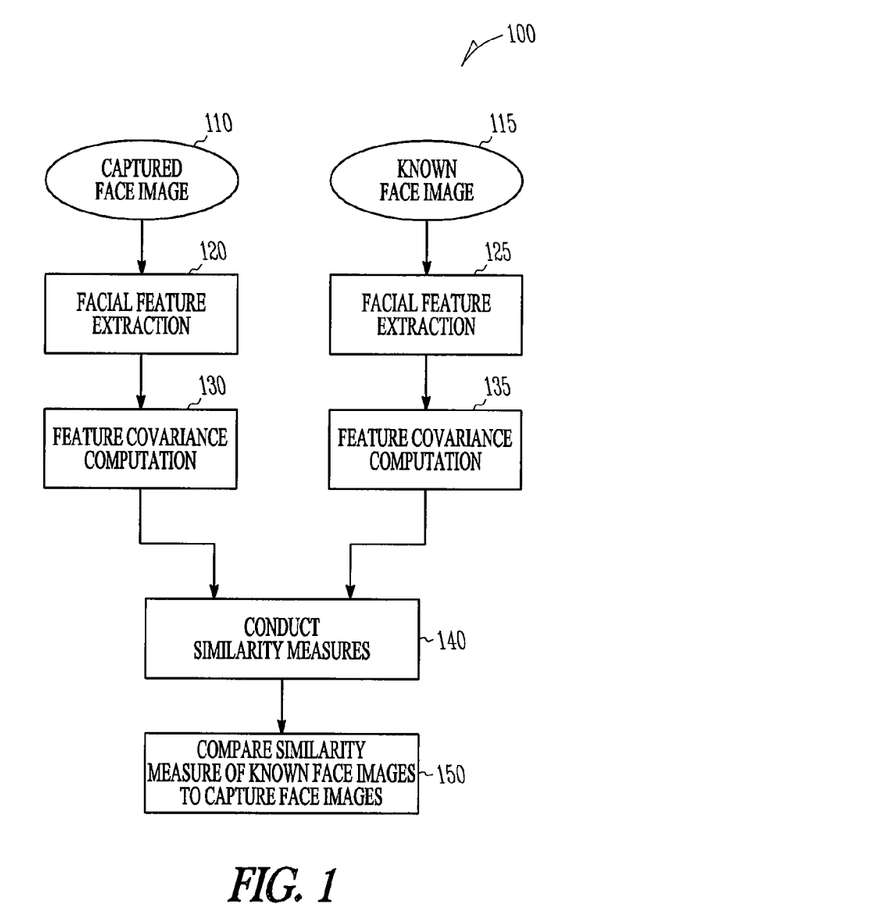
FIG. 1 is a flowchart illustrating a method for covariance based face association according to an example embodiment.

FIG. 1 is a method for covariance based face association according to an example embodiment. Once a face image has been captured by activity 110 of method 100 the image will be associated with other images, such as known face images 115.

Once the face image is captured, a full set of features, referred to as a feature vector, is extracted at 120, 125 for each of the captured faces and the known images respectively. The features are comprised of the response of selected filters followed by applying a set of spatial masks. For example, the selected filters can be horizontal or vertical gradient filters or a set of Gabor filters. Activity 120 applies a series of spatial masks to the response of each filter on the face image. Similarly activity 125 applies the same masks to filter responses on the known face image. While these activities are shown to occur concurrently activity 125 may occur prior to activity 120, concurrently with activity 120 or after activity 120. In addition activity 125 may be applied to several known images to allow for comparison of several images.

Figure 2:
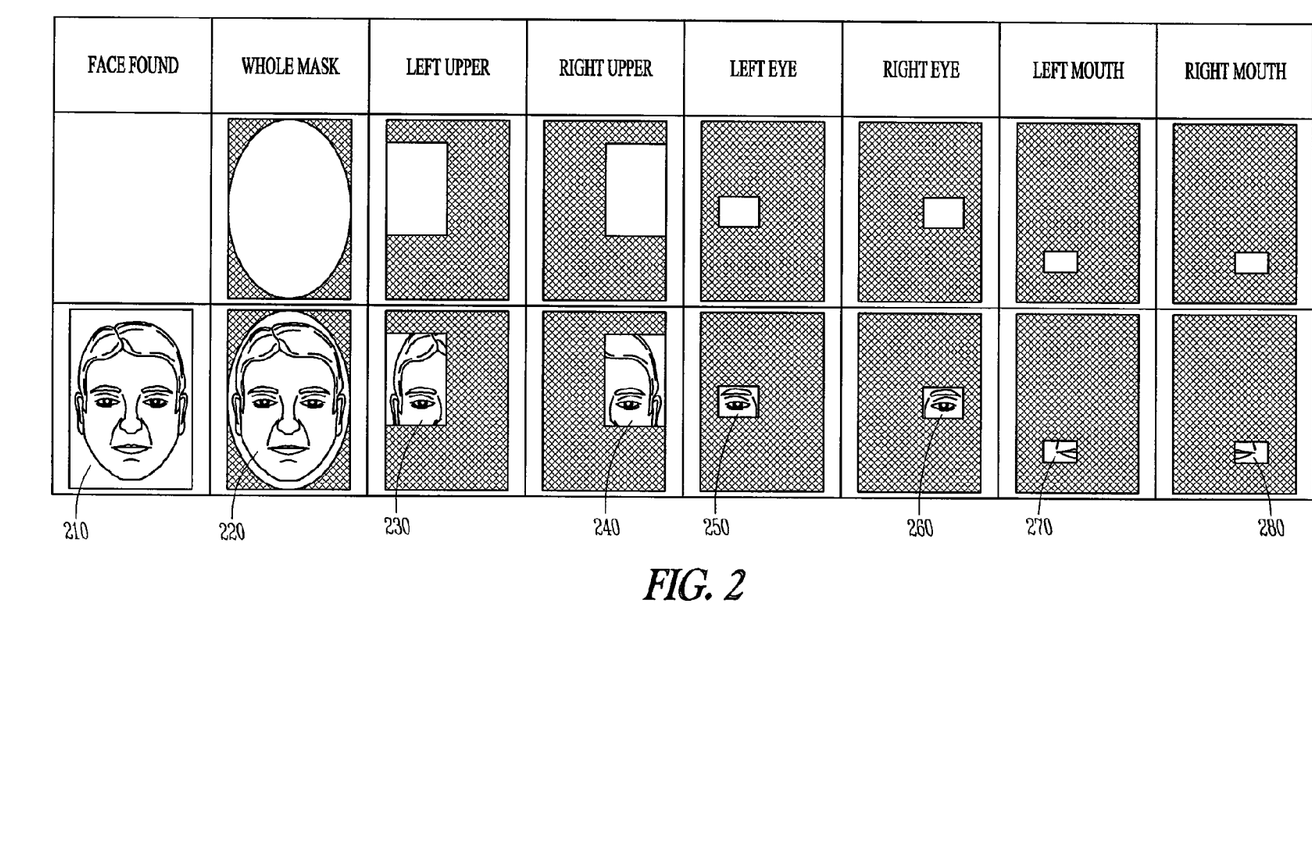
FIG. 2 illustrates a series of masks that may be placed over the face according to an example embodiment.

FIG. 2 illustrates a series of masks that may be placed over the face according to an example embodiment. For purposes of illustration, the face shown in the masks of FIG. 2 are of a line drawn face. In actual embodiments a real image of a face is used. The line drawn face sufficiently illustrates the embodiments. The masks are placed over the filter response on the face image to generate the feature vector and a covariance is computed from the selected feature vectors. A similarity measure is computed between corresponding covariances of mask parts. For example as shown in FIG. 2, the full face 210 as found by the detection software, may have masks applied to it. A whole mask 220, the left upper quadrant 230, the right upper quadrant 240, the left eye 250, the right eye 260, the left mouth 270 and the right mouth 280.

Activity 120 of FIG. 1 applies a filter to the selected masks of the captured face image. The filter is a Gabor filter which is a linear filter whose impulse response is defined by a harmonic function multiplied by a Gaussian function. Because of the multiplication-convolution property (Convolution theorem), the Fourier transform of a Gabor filter's impulse response is the convolution of the Fourier transform of the harmonic function and the Fourier transform of the Gaussian function.

The feature vector for each pixel in the face image is composed from the following elements: $[\hat{x}, \hat{y}, G_1, \ldots, G_i, \ldots, G_N]$ Where $\hat{x}, \hat{y}$ are the normalized pixel locations from 0 to 100 of the face rectangle, and $G_i$ is the convolution of the image at location (x, y) with the selected filters. As an example, the filters can be Gabor filters $G(x, y, \theta, f)$ with 5 scales (f) and 6 orientations ($\theta$), there would be N=30 Gabor filters applied. As a result if the example is used a 32×32 covariance matrix will result from the Gabor filter application as illustrated at 130 for the captured image. Activity 135 applies the filters to each of the masked images of the known face images. This activity applies the filters to the same masks used by the captured image. The filters can be Gabor filters in some embodiments. In further embodiments, the number of Gabor filters may be varied and may be based on the scale and orientation parameters of the Gabor filter.

Activities 130 and 135 compute a covariance matrix of the elements $[\hat{x}, \hat{y}, G_1, \ldots, G_i, \ldots, G_N]$ Activity 140 computes basic similarity measures between the covariance matrices comparing the captured image to the known images. The basic similarity measure uses the following formula, known as Forstner distance:

$$p(C_i, C_j) = \sqrt{\sum_{k=1}^{d} \ln^2 \lambda_k(C_i, C_j)}$$

where $\lambda_k(C_i, C_j)$ are the generalized eigenvalues $C_i$ is the covariance matrix for the captured image and $C_j$ is the covariance matrix for the known image.

Activity 150 compares similarity measures for each of the masks to be combined up for each mask utilized for the images.

Figure 3:
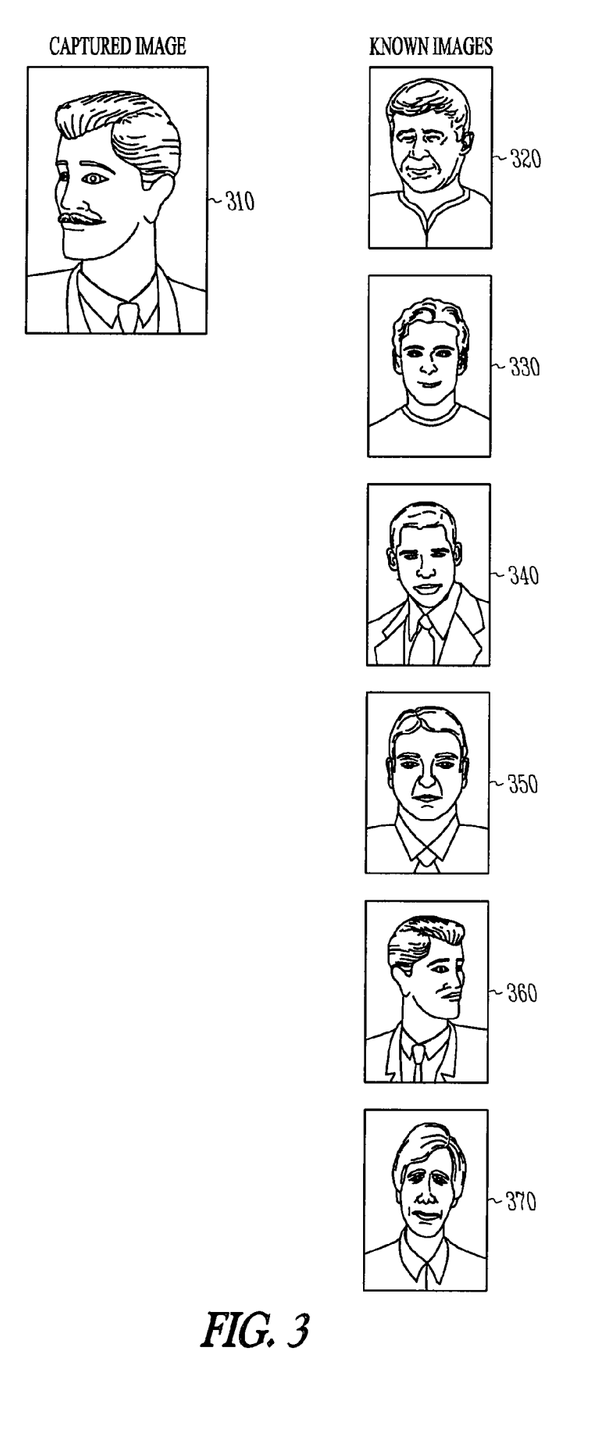
FIG. 3 is an example captured image and a plurality of example known images.

FIG. 3 is an example captured image shown in line drawing form and a plurality of example known images, also shown in line drawn form. As an example FIG. 3 illustrates a series of images that may be compared. Image 310 may be the image captured by a security camera, or a still image provided from a third party. Known images 320, 330, 340, 350, 360, and 370 may exist in a database and may be compared with the captured image. While the example embodiments discuss known images, the methods and systems described may be utilized to associate a plurality of images to another plurality of images. The captured image 310 of FIG. 3 may have the activities 120, and 130 applied to provide for a series of covariance matrices characterizing the image 310. As discussed, the known images 320, 330, 340, 350, 360 and 370 may have activities 125 and 135 applied to provide for a series of covariance matrixes characterizing the images 320, 330, 340, 350, 360 and 370.

Activity 140 may then apply the similarity measures to each of the covariance matrices of the captured image 310, with each of the covariance matrices of the known images 320, 330, 340, 350, 360 and 370. The similarity measures are then weighted and summed in activity 150 to determine which of the known images is closest to the captured image. The weight are assigned based on the importance of the facial parts to the discrimination of the two faces. For example, similarity measures related to the left and right eye spatial masks are weighted higher than similarity measures related to Left and Right mouth. As an example the captured image 310 may have masks for the whole mask, left upper, right upper and right eye applied. The Gabor filters will then be applied to each of the masks. The same process will be applied to each of the known images 320, 330, 340, 350, 360, and 370. Once the covariance matrices are determined the similarity measures are conducted. This is accomplished by applying the similarity measure to each covariance matrix of the captured image 310 to the corresponding covariance matrix for the known images. The similarity measures for each calculation may be weighted and then combined to come to a total for each association. The combination can be the weighted sum, and the lowest sum total is the known image most closely similar the captured image.

Figure 4:
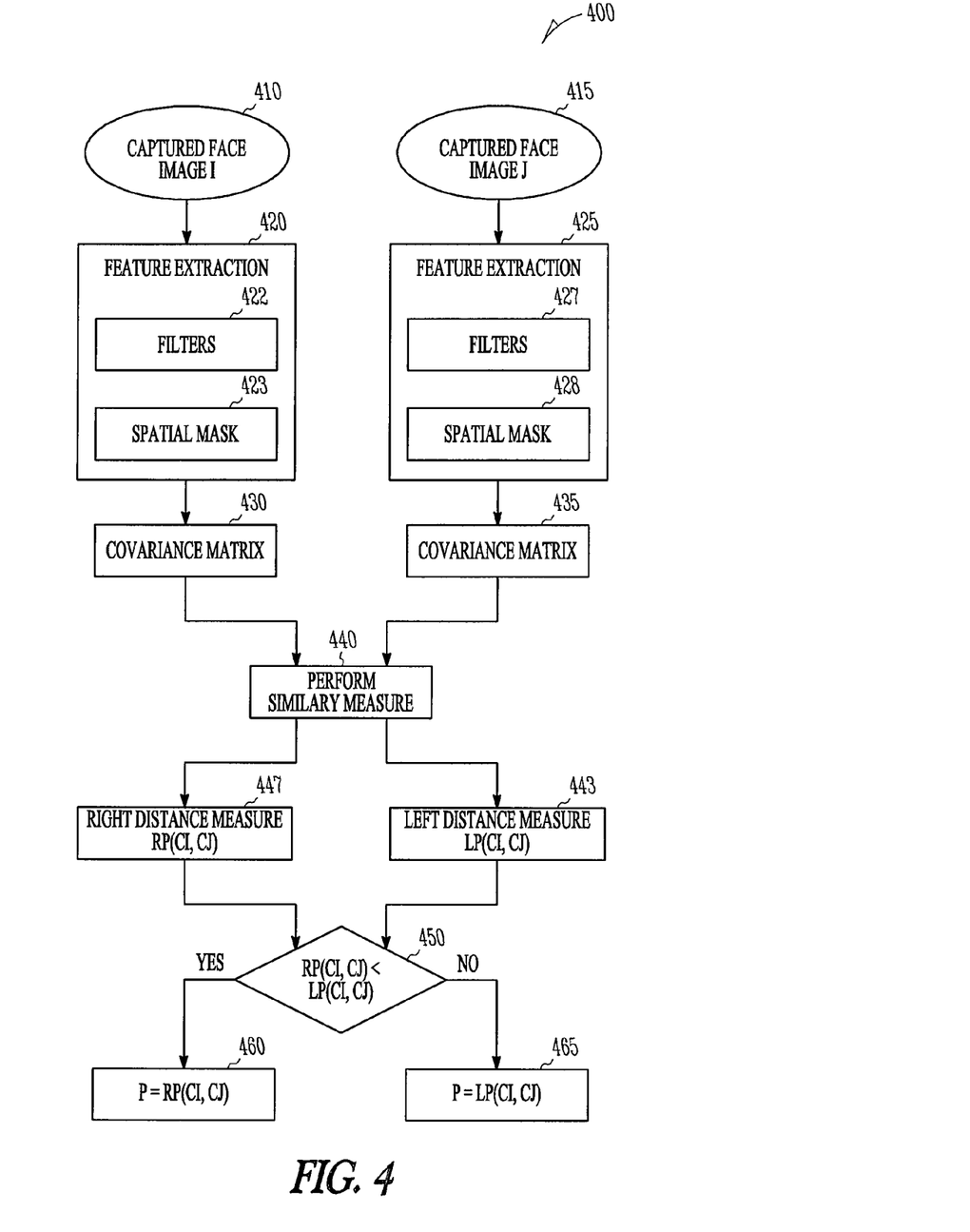
FIG. 4 is a flowchart illustrating a method for covariance based face association with comparison of sides according to an example embodiment.

FIG. 4 is a method for covariance based face association with comparison of sides according to an example embodiment. Activity 410 may be to present a captured image (I). Activity 420 extracts features from the captured image (I). Activity 420 may apply Gabor filters to the image (I) at 422, and then apply a spatial mask or a plurality of masks to image (I) at 423. Activity 415 may provide at least one known face image (J). Activity 425 may extract features from the known image (J) by applying the Gabor filters at 427 to each of the extracted features and then apply a spatial mask or plurality of masks to image (J) at 428. Covariance matrices for the captured and known images are derived at 430 and 435 respectively. Activity 440 performs a similarity measure on the covariance matrixes that result from activities 430 and 435.

Activity 443 is to add the similarity measures for the left side of the face. This is accomplished by adding the similarity measures for the masks on the left side of the face for example mask 230 of the left upper, mask 250 for the left eye and mask 270 for the left mouth. The results of the weighted similarity measure are added and a result LP is determined. It is possible to increase or decrease the weight a mask will have on the result by scaling the similarity measure for that mask section.

Activity 447 is to add the similarity measures for the right side of the face. This is accomplished by adding the similarity measures for the masks on the right side of the face for example mask 240 of the right upper, mask 260 for the right eye and mask 280 for the right mouth. The results of the similarity measure are added and a result RP is determined. It is also possible to increase or decrease the weight a mask will have on the result by scaling the similarity measure for that mask section.

Activity 450 is to determine if LP is less than RP. If LP is less than RP, activity 460 is to determine that the similarity measure P=LP($C_I$, $C_J$) where $C_I$ is the covariance matrixes for the captured image and $C_J$ is the covariance matrixes for the known image. If LP is not less than RP, activity 465 is to determine that the similarity measure P=RP($C_I$, $C_J$).

Method 400 of FIG. 4 compares the similarity measures of Left and Right masks and selects the minimum similarity measure. It should be noted however that any combination, i.e. top and bottom, etc. may be used.

Figure 5:
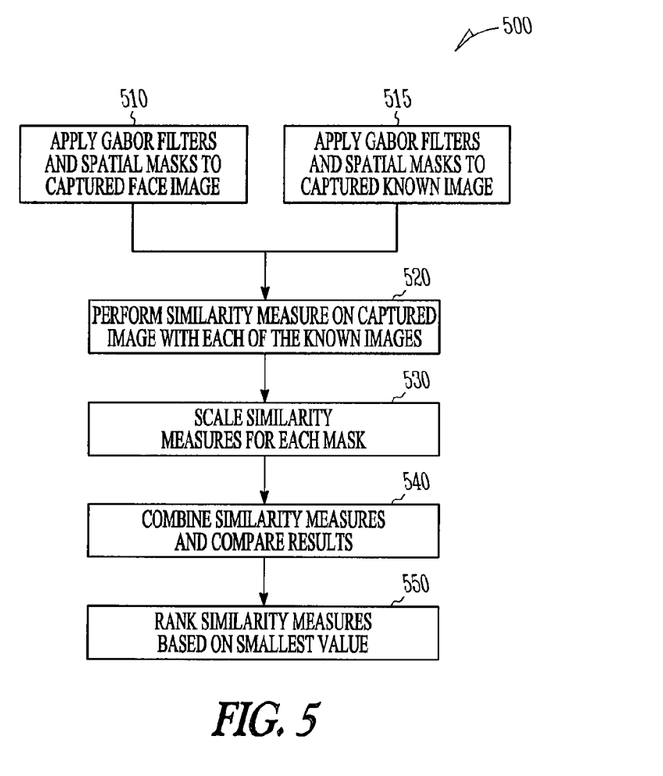
FIG. 5 is a flowchart illustrating a method for adding similarity measures for multiple masks for multiple comparisons of a captured image to a plurality of known images according to an example embodiment.

FIG. 5 is a method for adding the similarity measures for multiple masks for multiple comparisons of a captured image to a plurality of known images according to an example embodiment. Activity 510 is to apply the masks and Gabor filters to a captured image. Activity 515 is to apply masks and Gabor filters to a plurality of known images. Activity 520 is to perform the similarity measure on the captured image with each of the known images. As discussed if the whole mask (wm), the left upper (lu), right upper (ru) and right eye (re) masks are applied similarity measures p will be calculated for each for each association. The total is then calculated as follows:

$w_{wm}p_{wm} + w_{lu}p_{lu} + w_{ru}p_{ru} + w_{re}p_{re}$ = summed similarity measure Activity 530 is to scale the similarity measures for each mask. To increase the influence of any one mask the similarity measure for that mask may have a multiplier applied.

Activity 540 is to add the similarity measures and compare the results. Activity 550 is to determine the smallest total similarity measure. The similarity measures will move closer to zero as the images are closer in resemblance, therefore, the association with the smallest similarity measure will result from the known image that is closest to the captured image. Therefore, as an example if the images of FIG. 3 where utilized the similarity measure for images 310, the captured image, and image 360 of the known images should have the lowest similarity measure.

Figure 6:
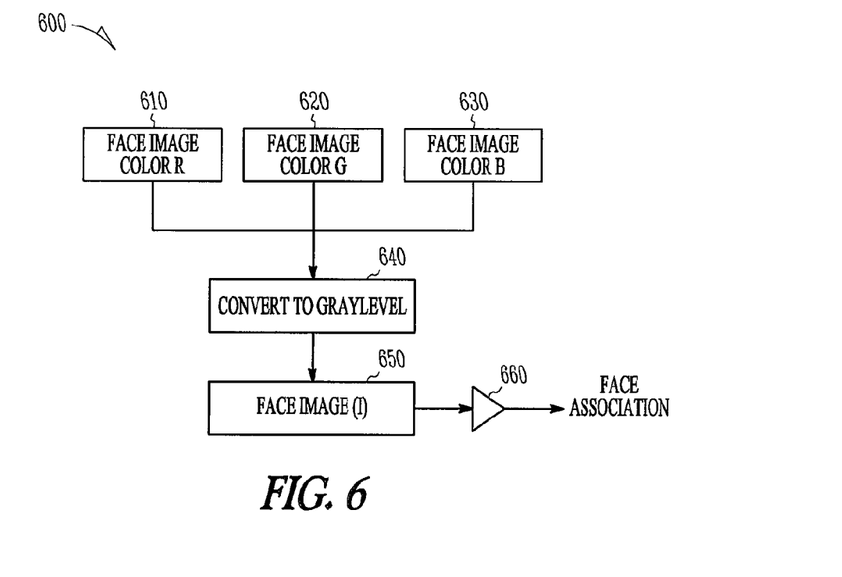
FIG. 6 is a flowchart illustrating a method for converting a color image to a graylevel image for face association according to an example embodiment.

While methods 100, 400 and 500 of FIG. 1 may be utilized with color images broken into red, blue and green color images from corresponding red, green and blue channels, it may be desirable to have gray scale images. FIG. 6 is a method for converting a color image to a graylevel image for face association according to an example embodiment. When an image is captured it is often captured as a color image with red, green and blue images. Method 600 converts the color image to a grayscale image. Activity 610 may be to identify the red features of a face image. Activity 620 may be to identify the green features of a face image. Activity 630 may be to identify the blue features of the image. Activity 640 may be to convert the red, green and blue features to gray levels. Activity 650 may be the assemble the gray levels into a face image. The face image may be provided to a buffer 660 and then to a face association process 100, 400 or 500 of FIG. 1, FIG. 4 and FIG. 5.

Figure 7:
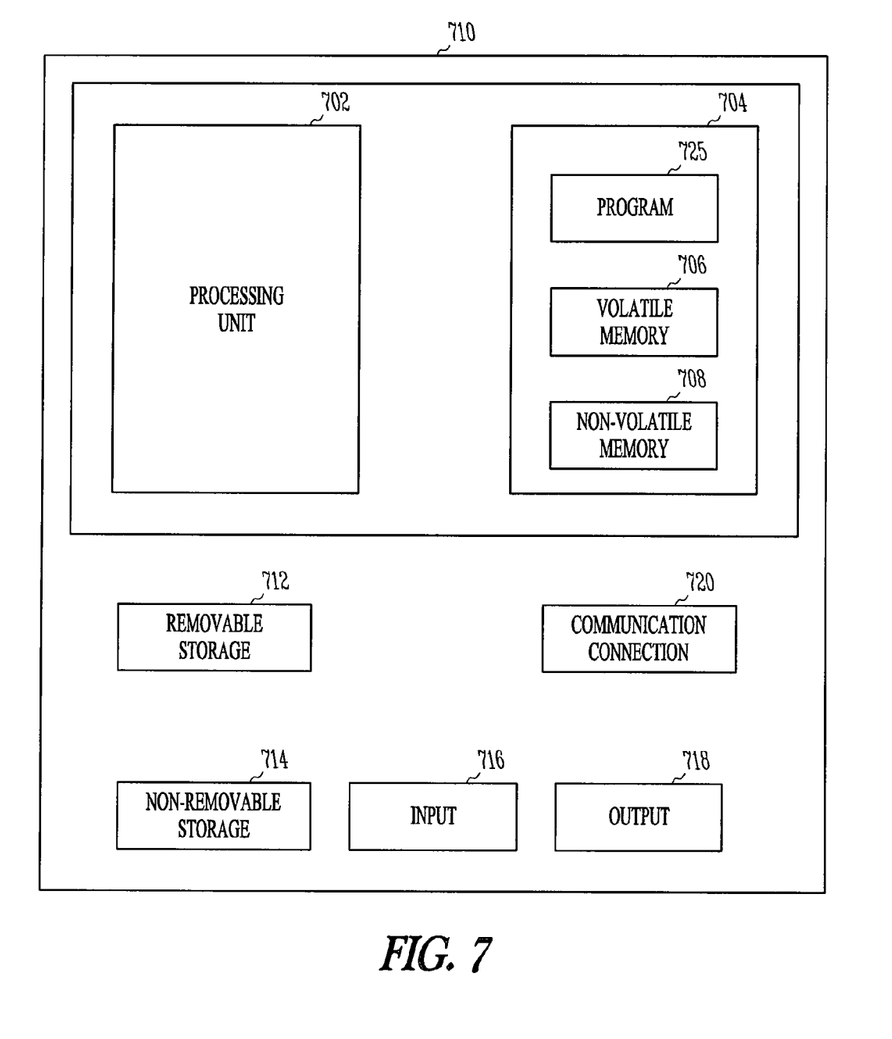
FIG. 7 is a block diagram of a typical computer system used to implement methods according to an example embodiment.

A block diagram of a computer system that executes programming for performing the above algorithms and methods is shown in FIG. 7. A general computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions, as well as data, including video frames. Computer 710 may include or have access to a computing environment that includes input 716, output 718, and a communication connection 720. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a computer-readable medium.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. The above description and figures illustrate embodiments of the invention to enable those skilled in the art to practice the embodiments of the invention. Thus the following claims are hereby incorporated into the Detailed Description, with each claim standing on its own as a separate embodiment.

The invention claimed is:

1. A computer implemented method of associating a first face image with a second face image, the method comprising:
　applying a plurality of feature extractors via a computer to a first face image by use of a spatial mask and filter, wherein the spatial mask comprises a window and is configured to expose only a selected portion of the first face image;
　applying a plurality of feature extractors via the computer to a second face image by use of a spatial mask and filter, wherein the spatial mask comprises a window and is configured to expose only a selected portion of the second face image;
　computing via the computer a covariance based similarity measure of the first image and the second face image from extracted features;
　providing and storing on a computer readable storage device, a similarity measurement of the first face image and the second face image;
　applying a plurality of masks to the extracted features to produce a plurality of first image response masks and second image response masks;
　applying a plurality of Gabor filters to each of the first image and second image;
　applying a mask to each of the first image Gabor filter responses and second image Gabor filter responses; and
　adding similarity measures for the first image masks and second image masks;
　wherein the plurality of masks is one or more of a left eye mask, a right eye mask, a left mouth mask, and a right mouth mask;
　wherein the left eye mask and the right eye mask include only an eye, an eye lid, and an eye brow;
　wherein the left mouth mask includes only a left half of a mouth and the right mouth mask includes only a right half of the mouth; and
　wherein similarity measures related to the left eye mask and the right eye mask are weighted higher than similarity measures related to the left mouth mask and the right mouth mask.

2. The computer implemented method of claim 1 wherein applying a feature extractor comprises selecting a filter and selecting a spatial mask.

3. The computer implemented method of claim 2 wherein the filter is a Gabor filter with a selected orientation and scale.

4. The computer implemented method of claim 1 wherein the feature extractors apply Gabor filters to the face images and then apply a spatial mask to the Gabor filtered face images.

5. The computer implemented method of claim 1, further comprising determining if the first face image and the second face image are likely of the same face based on the similarity measure.

6. The computer implemented method of claim 1 wherein a number of Gabor filters are applied to the first face image and the same number of Gabor filters are applied to the second face image.

7. A method comprising:
applying a plurality of Gabor filters via a computer to a first face image to create a first covariance matrix stored on a computer readable storage device;
applying a plurality of Gabor filters via the computer to a plurality of known images to create a covariance matrix stored on a computer readable storage device for each of the plurality of known images;
applying a mask to the first face image and to each of the known images, wherein the mask comprises a window and is configured to expose only a selected portion of the first face image and each of the known images;
performing via the computer a similarity measure on the first covariance matrix with each of the covariance matrix for each of the plurality of known images;
applying a plurality of masks to extracted features to produce a plurality of first face image response masks and known image response masks;
applying a plurality of Gabor filters to each of the first face image and known images;
applying a mask to each of the first image Gabor filter responses and known image Gabor filter responses; and
adding similarity measures for the first face image masks and known image masks;
wherein the plurality of masks is one or more of a left eye mask, a right eye mask, a left mouth mask, and a right mouth mask;
wherein the left eye mask and the right eye mask include only an eye, an eye lid, and an eye brow;
wherein the left mouth mask includes only a left half of a mouth and the right mouth mask includes only a right half of the mouth; and
wherein similarity measures related to the left eye mask and the right eye mask are weighted higher than similarity measures related to the left mouth mask and the right mouth mask.

8. The method of claim 7, further comprising adding all of the similarity measures for each of the plurality of masks to determine a total similarity measure.

9. The method of claim 8, further comprising scaling the similarity measures for each of the plurality of masks.

10. The method of claim 7, further comprising associating the first face image with a known image producing the smallest similarity measure.

11. The method of claim 7, wherein the similarity measure is performed for at least one left mask and one right mask, comparing the similarity measures and selecting the lesser similarity measure.

12. The method of claim 11, further comprising associating the first face image with a known image producing the smallest similarity measure.

13. A system comprising:
a memory for storing a plurality of known images;
an input for receiving an image;
a processor for:
applying a plurality of filters to the face image;
applying a plurality of spatial masks to each of the filter responses of the face image, wherein the spatial masks comprise windows and are configured to expose only a selected portion of the filter responses of the face image;
creating a plurality of covariance matrices corresponding to the plurality of spatial masks;
applying a plurality of filters to the plurality of known images;
applying a plurality of spatial masks to each of the filter responses to the plurality of known images, wherein the spatial masks comprise windows and are configured to expose only a selected portion of the filter responses to the plurality of known images;
creating a plurality of covariance matrices corresponding to the plurality of spatial masks for each of the plurality of known images;
performing a similarity measure on the covariance matrix of the corresponding mask with each covariance matrix of the corresponding mask for each of the plurality of known images;
combining the similarity measures from the selected spatial masks;
applying a plurality of Gabor filters to each of the face image and known images;
applying a mask to each of the face image Gabor filter responses and known image Gabor filter responses; and
adding similarity measures for the face image masks and known image masks;
wherein the plurality of masks is one of left eye mask, a right eye mask, a left mouth mask, and a right mouth mask;
wherein the left eye mask and the right eye mask include only an eye, an eye lid, and an eye brow;
wherein the left mouth mask includes only a left half of a mouth and the right mouth mask includes only a right half of the mouth; and
wherein similarity measures related to the left eye mask and the right eye mask are weighted higher than similarity measures related to the left mouth mask and the right mouth mask.

14. The system of claim 13, further comprising associating the image with one of the plurality of known image producing the smallest combined similarity measure.

15. The system of claim 14, wherein the filters are Gabor filters with predefined scale and orientation, and wherein the combined similarity measure is the weighted sum of the computed similarity measures.

* * * * *